(12) United States Patent
Xu et al.

(10) Patent No.: US 11,062,223 B2
(45) Date of Patent: Jul. 13, 2021

(54) FORECASTING FIELD LEVEL CROP YIELD DURING A GROWING SEASON

(71) Applicant: The Climate Corporation, San Francisco, CA (US)

(72) Inventors: Lijuan Xu, Foster City, CA (US); Ying Xu, Boston, MA (US)

(73) Assignee: THE CLIMATE CORPORATION, San Francisco, CA (US)

( * ) Notice: Subject to any disclaimer, the term of this patent is extended or adjusted under 35 U.S.C. 154(b) by 1288 days.

(21) Appl. No.: 14/956,657

(22) Filed: Dec. 2, 2015

(65) Prior Publication Data

US 2017/0161627 A1    Jun. 8, 2017

(51) Int. Cl.
| | |
|---|---|
| *G06N 7/00* | (2006.01) |
| *G06Q 10/04* | (2012.01) |
| *G06Q 50/02* | (2012.01) |
| *G06N 3/12* | (2006.01) |
| *G06N 3/00* | (2006.01) |
| *G06N 20/00* | (2019.01) |

(52) U.S. Cl.
CPC ............ *G06N 7/005* (2013.01); *G06N 20/00* (2019.01); *G06Q 10/04* (2013.01); *G06Q 50/02* (2013.01); *G06N 3/006* (2013.01); *G06N 3/126* (2013.01)

(58) Field of Classification Search
CPC ........ G06N 7/005; G06N 20/00; G06N 3/006; G06N 3/126; G06Q 50/02; G06Q 10/04
See application file for complete search history.

(56) References Cited

U.S. PATENT DOCUMENTS 9,140,824 B1   9/2015  Mewses et al.
2005/0234691 A1* 10/2005 Singh .................... G06Q 10/04
                                              703/11

(Continued)

FOREIGN PATENT DOCUMENTS

CN    103 955 860 A    7/2014
EP    1 473 673 A2     11/2004

(Continued)

OTHER PUBLICATIONS

Stephanie, Lowess Smoothing in Statistics: What is it, 2013, Statistics How to, pp. 1-2 (Year: 2013).*

(Continued)

*Primary Examiner* — Regis J Betsch
(74) *Attorney, Agent, or Firm* — Hickman Becker Bingham Ledesma LLP

(57) ABSTRACT

A method for predicting field specific crop yield recommendations is disclosed. A computer system receives data records, including remotely sensed spectral property of plant records and soil moisture records. The system aggregates the records to create geo-specific time series over a specified time. The system selects representative features from the geo-specific time series and creates, for each specific geographic area, a covariate matrix in computer memory comprising the representative features. The system assigns a probability value to a component group in a set of parameter component groups, where each component group includes one or more regression coefficients and an error term calculated from probability distributions. The system is programmed to generate generates the probability distributions used to determine the regression coefficients and the error term, the probability distribution used to generate the error term is defined with a mean parameter set at zero and a variance parameter set to a field specific bias coefficient.

24 Claims, 11 Drawing Sheets

(56) References Cited

U.S. PATENT DOCUMENTS

| | | |
|---|---|---|
| 2011/0166788 A1 | 7/2011 | Griffin |
| 2014/0198986 A1 | 7/2014 | Marchesotti |
| 2014/0278731 A1 | 9/2014 | Griffin et al. |
| 2014/0358486 A1 | 12/2014 | Osborne |
| 2015/0026023 A1 | 1/2015 | Sirota et al. |
| 2015/0302305 A1 | 10/2015 | Rupp et al. |
| 2016/0253595 A1* | 9/2016 | Mathur .................. A01G 22/00 706/12 |

FOREIGN PATENT DOCUMENTS

| | | |
|---|---|---|
| JP | 2012-198688 A | 10/2012 |
| JP | 2015-000049 A | 1/2015 |
| RU | 2 415 556 C1 | 4/2011 |
| RU | 2 537 912 C2 | 1/2015 |
| WO | WO2009/048341 A1 | 4/2009 |
| WO | WO 2015/0151339 A1 | 4/2015 |
| WO | WO2015/100023 A1 | 7/2015 |

OTHER PUBLICATIONS

Liu et al., On Segmented Multivariate Regression, 1997, Statistics Sinica, pp. 497-525 (Year: 1997) (Year: 1997).*

R.J. Ooserbann, Frequence and Regression Analysis of Hydrologic Data Part II: Regression Analuysis, 1994, ILRI Publication 16, second revised addition, pp. 1-24 (Year: 1994) (Year: 1994).*

Quarmby et al., "Linear mixture modelling applied to AVHRR data for crop area estimation", INT. J. Remote Sensing, 1992, vol. 13, No. 3, 415-425 (Year: 1992).*

Verma et al., "Linear Mixed Modeling for Mustard Yield Prediction in Haryana State (India)", Journal of Mathematics and Statistical Science, vol. 2015, 96-105 (Year: 2015).*

European Patent Office, "Search Report" in application No. 16871523.3-1222, dated Mar. 14, 2019, 11 pages.

European Claims in application No. 16871523.3-1222, dated Mar. 2019.

International Searching Authority, "Search Report" in application No. PCT/US2016/064468, dated Feb. 16, 2017, 24 pages.

Current Claims in application No. PCT/US2016/064468, dated Feb. 2017, 7 pages.

The International Bureau of WIPO, "Report on Patentability" in application No. PCT/US2016/064468, dated Jun. 5, 2018, 13 pages.

Current Claims in application No. PCT/US2016/064468, dated Jun. 2018, 7 pages.

Integrating Environmental Covariates and Crop Modeling into the Genomic Selection Framework to Predict Genotype-Environment Interactions, Theoretical-Applied Genetics, vol. 127, Iss. 2, Feb. 2014, 52pgs.

European Patent Office, "Search Report" in application No. 16 871 523.3-1222, dated Oct. 30, 2019, 10 pages.

European Claims in application No. 16 871 523.3-1222, dated Oct. 2019, 5 pages.

Brazil Patent Office, "Search Report" in application No. BR1120180112402, dated Dec. 31, 2019, 2 pages.

Brazil Claims in application No. BR1120180112402, dated Dec. 2019, 7 pages.

Argentina Patent Office, "Search Report with Translation" in application No. 20160103689, dated Aug. 26, 2020, 11 pages.

Argentina Claims in application No. 20160103689, dated Aug. 2020, 8 pages.

* cited by examiner

Fig. 2
(a)
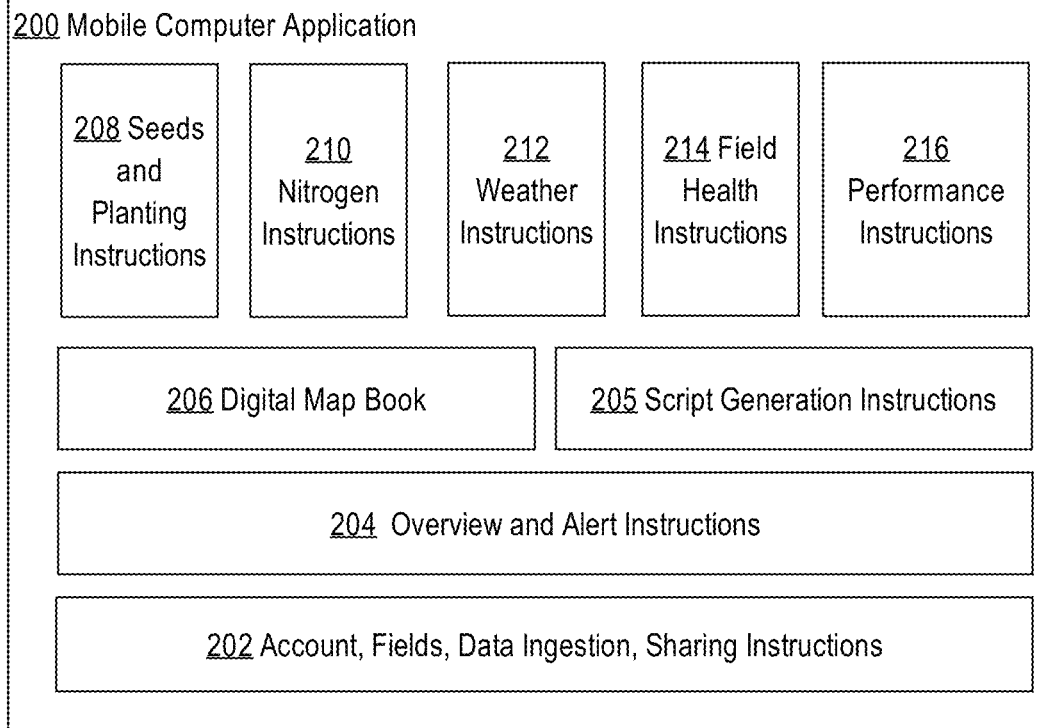
(b)
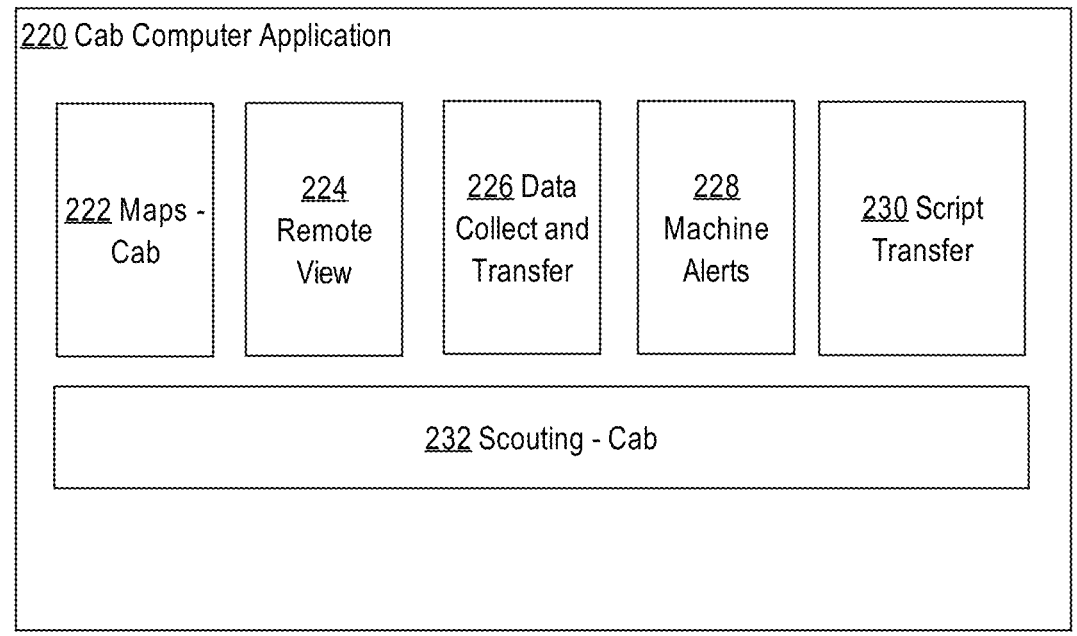

FORECASTING FIELD LEVEL CROP YIELD DURING A GROWING SEASON

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure relates to computer systems and computer-implemented methods that are configured for creating data values that are useful in forecasting an agricultural crop yield for an agricultural field, during a growing season, based on data measurements over a specific time period.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section Agricultural production requires significant strategy and analysis. In many cases, agricultural growers, such as farmers or others involved in agricultural cultivation, are required to analyze a variety of data to make strategic decisions before and during the crop cultivation period. In making such strategic decisions, growers rely on computer-implemented crop yield forecast models to determine their cultivation strategy. Crop yield forecast models may help a grower decide how to spend or conserve in key areas that affect cultivation, such as fuel and resource costs, equipment investments, crop related insurance, and crop cultivation manpower.

Remote sensing imagery captured from satellites has been used to complement traditional weather data because of their finer spatial resolutions, greater availability in the globe, and their ability to capture measurements during the crop season. However, remote sensing imagery used to estimate end of season production potentials has been previously limited to estimating crop potentials at a county, regional, or state level. Larger estimations at the county, regional, or state level do not take into account variations within a field and may only represent a more generalized estimation at the field specific level.

Local studies that focus on field-level yield forecast generally fall short. Many studies that are claimed to be applicable to field-level yield forecast either rely on a limited sample set of field-level data or validate their field-level model results at a county level or larger, making their analysis hard to generalize.

Methods for analyzing a crop related data during the growing season and modeling crop yields at a field specific level are desirable.

BRIEF DESCRIPTION OF THE DRAWINGS

In the drawings:

FIG. 2 illustrates two views of an example logical organization of sets of instructions in main memory when an example mobile application is loaded for execution.

FIG. 9 depicts an example embodiment of a timeline view for data entry.

FIG. 10 depicts an example embodiment of a spreadsheet view for data entry.

DETAILED DESCRIPTION

Figure 1:
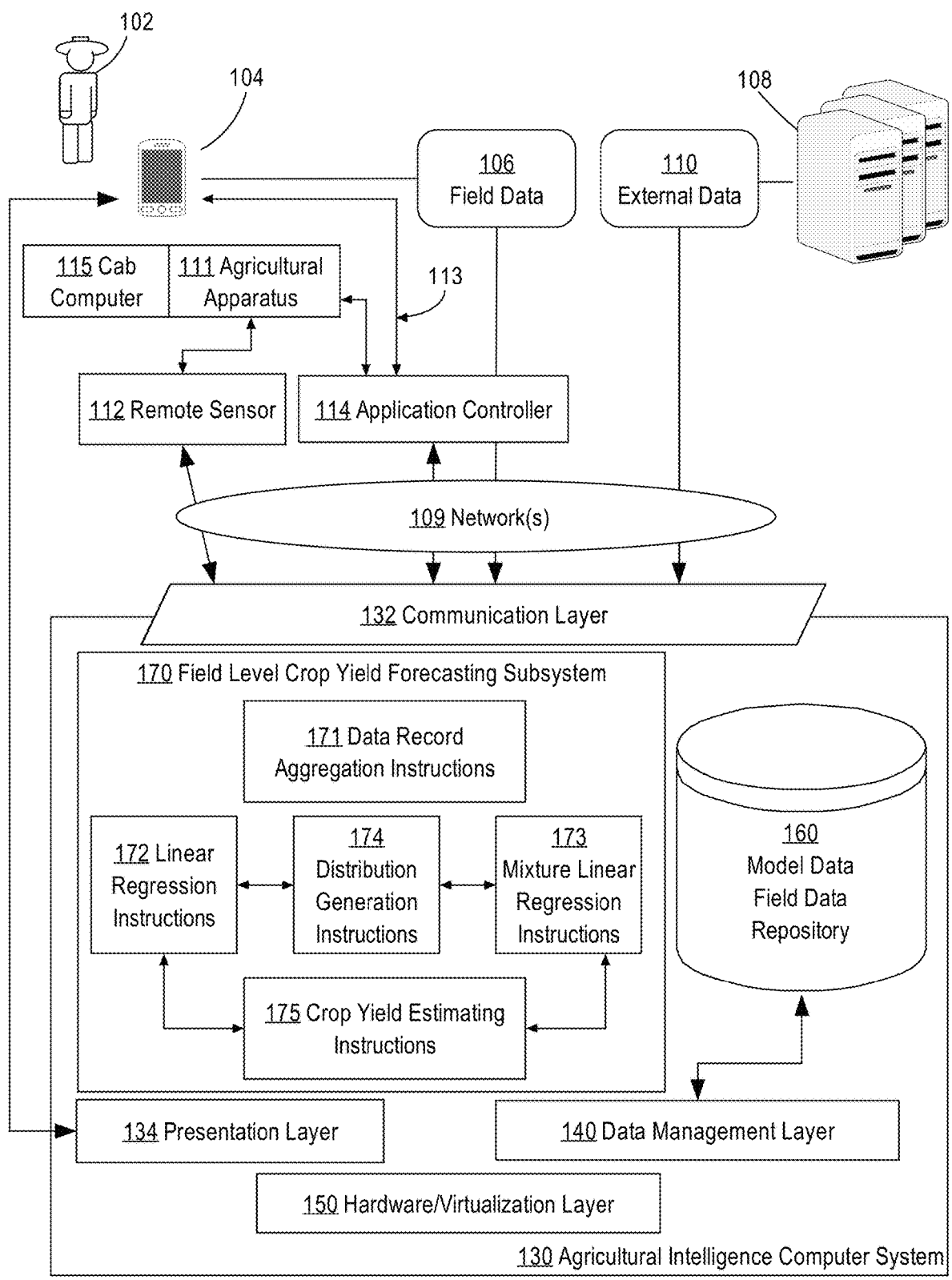
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
  1. GENERAL OVERVIEW
  2. EXAMPLE AGRICULTURAL INTELLIGENCE COMPUTER SYSTEM
    2.1. STRUCTURAL OVERVIEW
    2.2. APPLICATION PROGRAM OVERVIEW
    2.3. DATA INGEST TO THE COMPUTER SYSTEM
    2.4. PROCESS OVERVIEW—AGRONOMIC MODEL TRAINING
    2.5. FIELD LEVEL CROP YIELD FORECASTING SUBSYSTEM
    2.6. IMPLEMENTATION EXAMPLE—HARDWARE OVERVIEW
  3. FUNCTIONAL OVERVIEW—FORECASTING FIELD LEVEL CROP YIELD DURING A GROWING SEASON
    3.1. RECEIVING DATA
    3.2. AGGREGATING DATA RECORDS
    3.3. DETERMINING FIELD SPECIFIC CROP YIELD
      3.3.1. BASELINE LINEAR REGRESSION
      3.3.2. MIXTURE LINEAR REGRESSION 4. EXTERNAL DATA
4.1. REMOTE SENSING DATA
4.2. SOIL SPECTRUM DATA
5. GEO-SPECIFIC TIME SERIES
5.1. SIGNAL PREPROCESSING 1. General Overview A computer system and computer-implemented method that are configured for predicting field specific crop yields during the growing season using agricultural data is provided. In an embodiment, predicting crop yield for a field may be accomplished using a server computer system that is configured and programmed to receive over a digital communication network, electronic digital data representing agricultural data records, including remotely sensed spectral property of plant records and soil moisture records. Using digitally programmed data record aggregation instructions, the computer system is programmed to receive digital data including remotely sensed spectral property of plant records and soil moisture records. Using the digitally programmed data record aggregation instructions, the computer system is programmed to aggregate the one or more digital agricultural records to create and store, in computer memory, one or more geo-specific time series over a specified time. Using the digitally programmed data record aggregation instructions, the computer system is programmed to select one or more representative features from the one or more geo-specific time series and create, for each specific geographic area, a covariate matrix in computer memory comprising the representative features selected from the one or more geo-specific time series.

Using mixture linear regression instructions, the computer system is programmed to assign a probability value to a component group in a set of parameter component groups, where each component group within the set of parameter component groups includes one or more regression coefficients calculated from a probability distribution and an error term calculated from a probability distribution. Using distribution generation instructions, the computer system is programmed to generate the probability distributions used to determine the one or more regression coefficients and the error term. The probability distribution used to generate the error term is defined with a mean parameter set at zero and a variance parameter specific to each field.

Using crop yield estimating instructions, the computer system is programmed to determine a field specific crop yield for a specific date by using mixture linear regression instructions to calculate the field specific crop yield based upon the covariate matrix and the probability values assigned to each parameter component group in the set of parameter component groups.

2. Example Agricultural Intelligence Computer System
2.1. Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, temperature, wind, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

An data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 9:
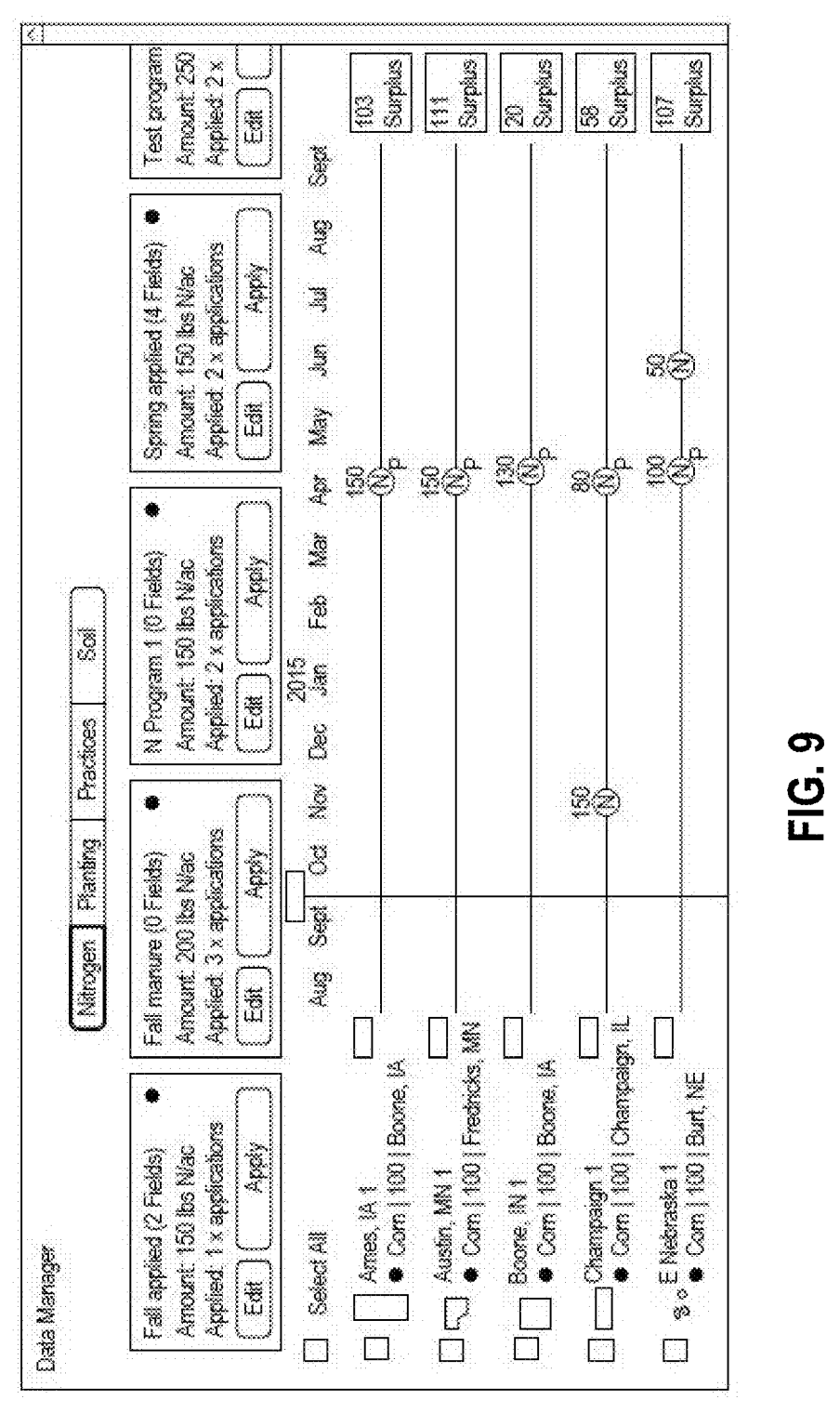

FIG. 9 depicts an example embodiment of a timeline view for data entry. Using the display depicted in FIG. 9, a user computer can input a selection of a particular field and a particular date for the addition of event. Events depicted at the top of the timeline include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 9, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 9, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 9, the interface may update to indicate that the "Fall applied" program is no longer being applied to the top field. While the nitrogen application in early April may remain, updates to the "Fall applied" program would not alter the April application of nitrogen.

Figure 10:
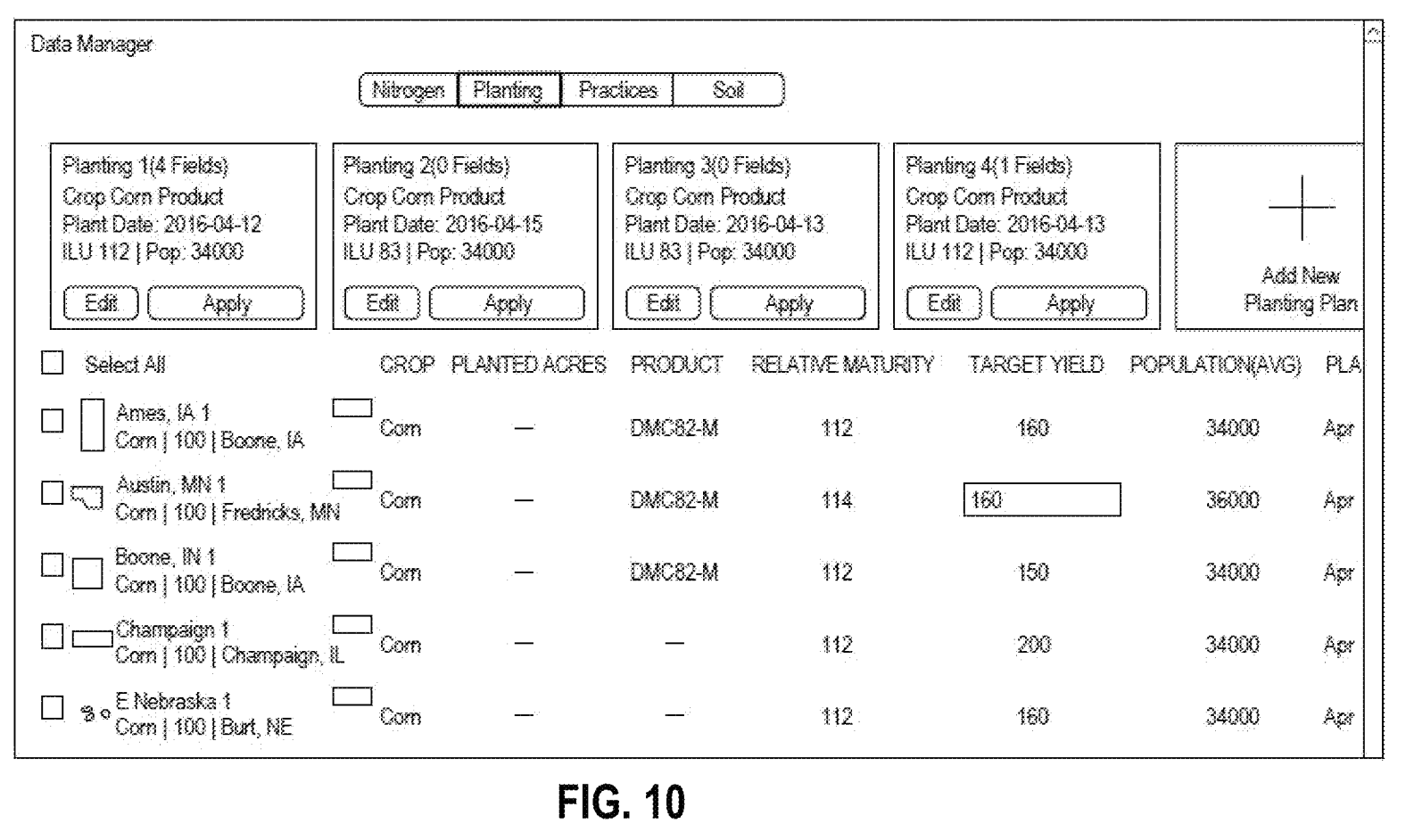

FIG. 10 depicts an example embodiment of a spreadsheet view for data entry. Using the display depicted in FIG. 10, a user can create and edit information for one or more fields. The data manager may include spreadsheets for inputting information with respect to Nitrogen, Planting, Practices, and Soil as depicted in FIG. 10. To edit a particular entry, a user computer may select the particular entry in the spreadsheet and update the values. For example, FIG. 10 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
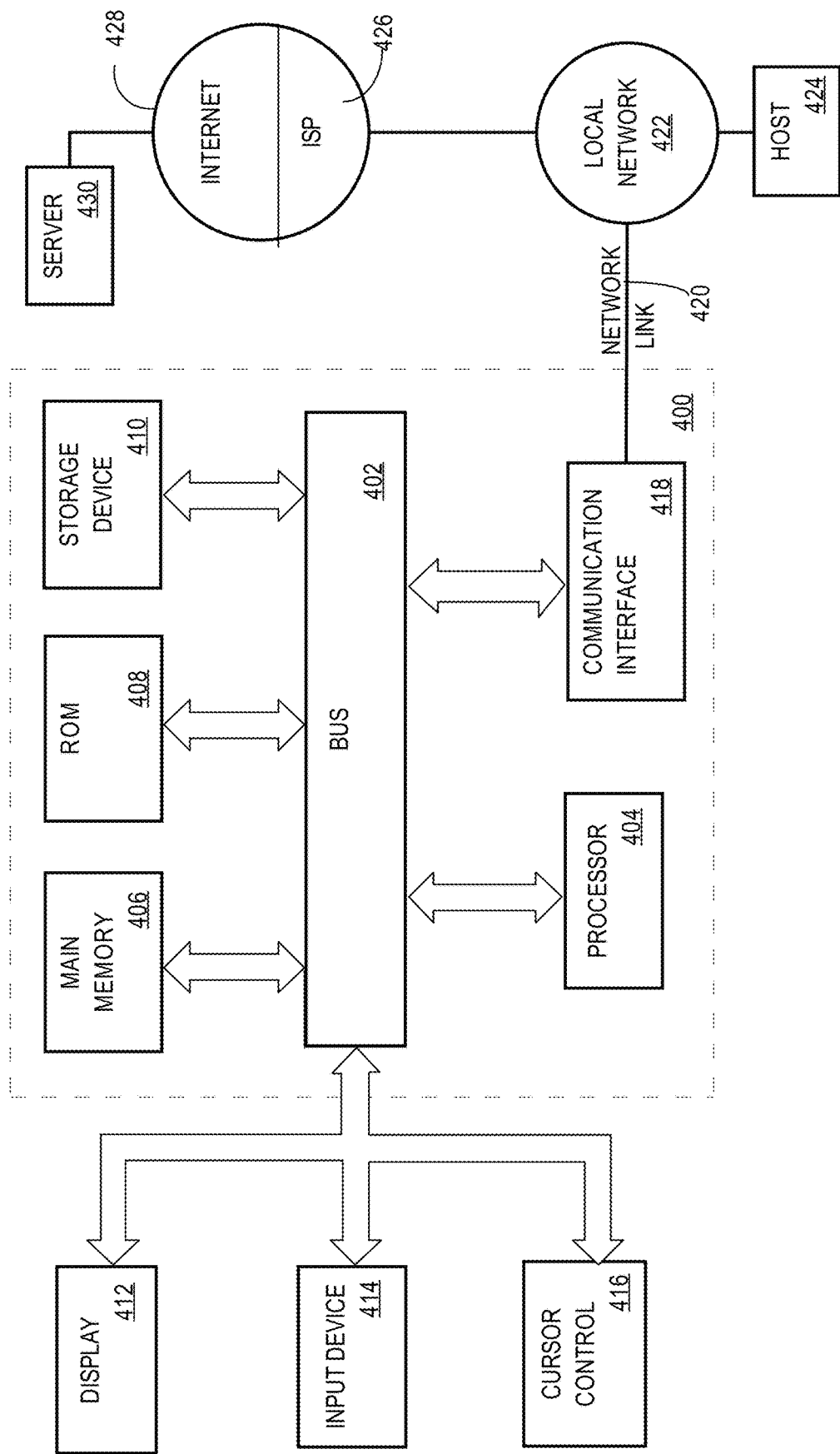
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

2.4 Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields.

The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
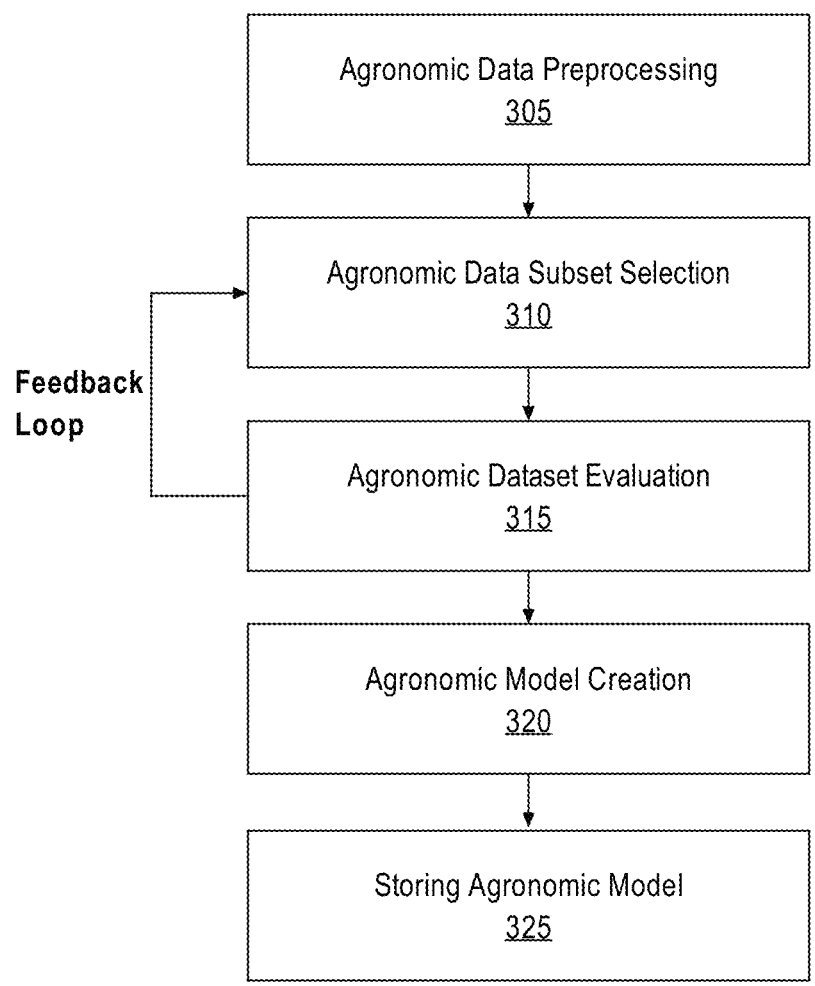
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Field Level Crop Yield Forecasting Subsystem

In an embodiment, the agricultural intelligence computer system 130, among other components, includes a field level crop yield forecasting subsystem 170. The field level crop yield forecasting subsystem 170 is configured to predict field specific crop yields during the growing season based on calculated covariate data points up to a specific observation date. Covariate data refers to independent variables that may be used in forecasting crop yields. In this context, the covariate data refers to aggregated agricultural data records that include data records related to remotely sensed signals and soil moisture data for a specific geo-location over a specific time period. Agricultural intelligence computing system 130 may use field level crop yield forecasts predicted by the field level crop yield forecasting subsystem 170 to create one or more scripts for one or more application controllers. For example, agricultural intelligence computing system 130 may use the field level crop yield forecasts to program planting and harvest equipment as well as other farming equipment used to maintain crop growth during the growing season.

In an embodiment, the field level crop yield forecasting subsystem 170 contains specially configured logic including, but not limited to, data record aggregation instructions 171, linear regression instructions 172, mixture linear regression instructions 173, distribution generation instructions 174, and crop yield estimating instructions 175 comprises executable instructions loaded into a set of one or more pages of main memory, such as RAM, in the agricultural intelligence computer system 130 which when executed cause the agricultural intelligence computer system 130 to perform the functions or operations that are described herein with reference to those modules. For example, the data record aggregation instructions 171 may comprise executable instructions loaded into a set of pages in RAM that contain instructions which when executed cause performing the fertility advisor functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the data record aggregation instructions 171, linear regression instructions 172, mixture linear regression instructions 173, distribution generation instructions 174, and crop yield estimating instructions 175 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system 130 to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130. The executable instructions in memory, or the stored source code, specified in this paragraph are examples of "modules" as that term is used in this disclosure.

The data record aggregation instructions 171 provide instructions to perform aggregation of agricultural data records into one of more geo-specific time series, where a geo-specific time series contains agricultural data values for a specific geo-location over a specified period of time. The linear regression instructions 172 provide instructions to create a linear regression model that models the relationship between data derived from agricultural data records and corn crop yield. The mixture linear regression instructions 173 provide instruction to create a mixture linear regression model, where a mixture linear regression model is a compilation of multiple linear regression models where the multiple linear regression models are assigned a probability value to their associated regression parameters. The distribution generation instructions 174 provide instruction for determining specific distribution values for linear regression parameters. The crop yield estimating instructions 175 provide instructions for estimating end-of-season field specific crop yield on a specific day based upon a geo-specific time series data and a linear regression model.

2.6. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Figure 5:
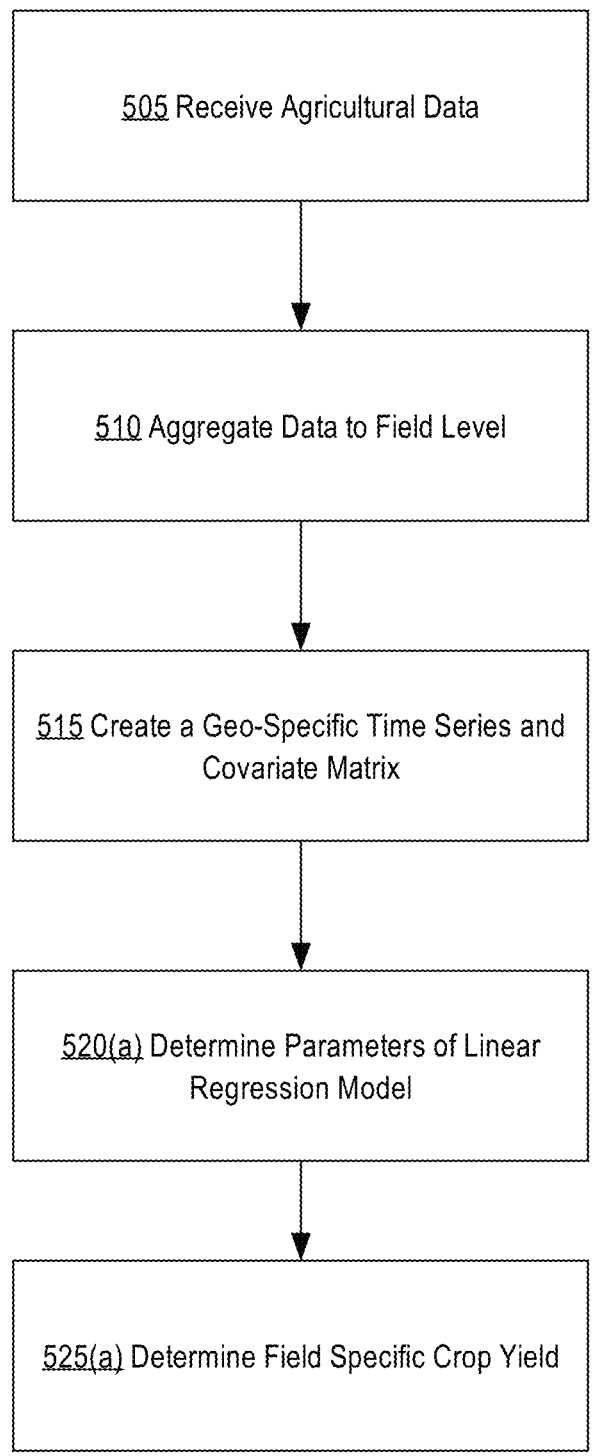
FIG. 5(a) depicts an example method of estimating crop yield using a baseline linear regression model.
FIG. 5(b) depicts an example method of estimating crop yield using a mixture linear regression model.
Figure 5:
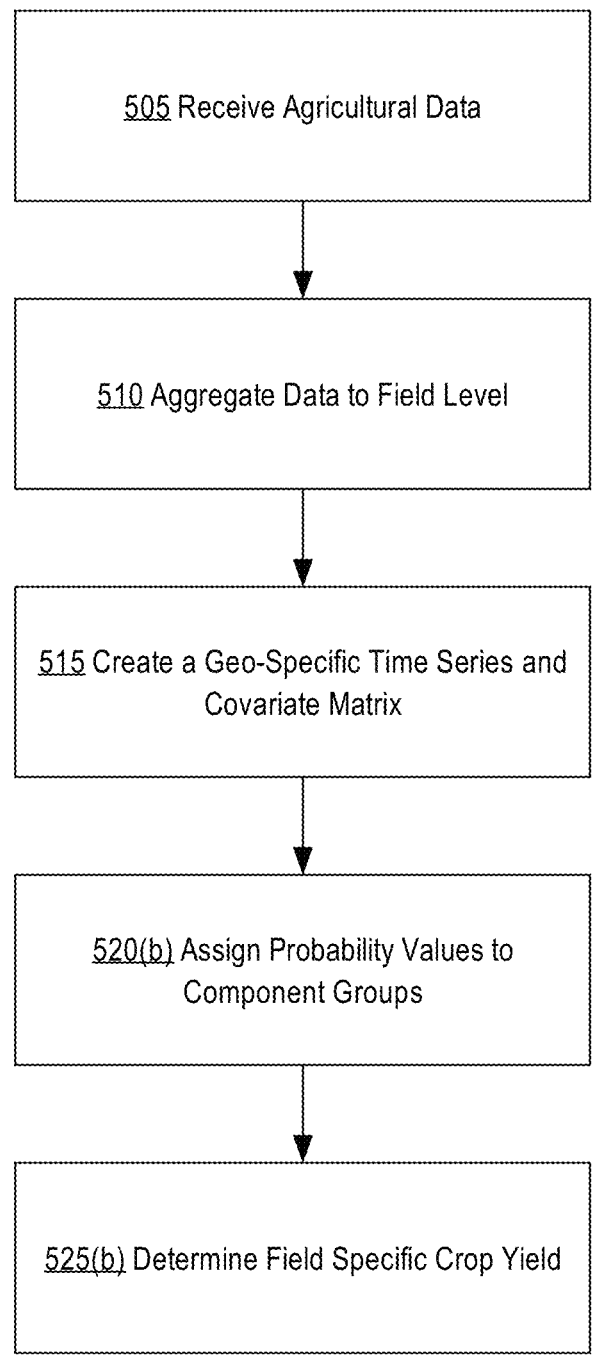

3. Functional Overview—Forecasting Field-Level Crop Yield During a Growing Season 5(a) and FIG. 5(b) depict example methods of predicting field specific crop yield based upon digital agricultural data records. FIG. 5(a) depicts a method of predicting field specific crop yield with a simple linear regression model. FIG. 5(b) depicts a method of predicting field specific crop yield with a mixture linear regression model. Steps 505, 510, and 515 in FIGS. 5(a) and 5(b) are identical.

3.1 Receiving Data

At step 505, agricultural data records are received. For example, agricultural intelligence computer system 130 may receive field data 106 from field manager computing device 104 and/or external data 110 from external data server computer 108. Field data 106 may include information related to the target field itself, such as field names and identifiers. As used herein, a 'field' refers to a geographically bounded area comprising a top field which may also comprise one or more subfields. In an embodiment, field data 106 is received from field manager computing device 104. For example, agricultural intelligence computer system 130 may cause display of an interface on field manager computing device 104 for inputting information, such as the bounds of the target field, the types of seed planted, and other crop and field related information.

External data 110 may include any additional data about the target field, including agricultural data records related to remotely sensed signals and soil moisture data for a specific geo-location at specific time period. In an embodiment, remotely sensed signals and soil moisture data may represent measurements for the target field or subfields within the target field. Remote sensing refers to the use of sensor technologies used to detect and classify objects on Earth by means of propagated signals. In an embodiment, remotely sensed signals are detected using Moderate Resolution Imaging Spectroradiometer (MODIS). MODIS is aboard the NASA satellites Terra and Aqua at the time of this writing, and provides a scan of the earth using 36 spectral bands, or groups of wavelengths. The level of resolution for each pixel may be measured down to a specified granularity in meters. Different spectral bands may be measured using different meter resolutions which include, but are not limited to, 250 meters, 500 meters, and 1000 meters. Different remotely sensed signals may be used to detect levels of vegetation on earth, as further described in the REMOTE SENSING DATA section herein.

Soil moisture data may be used to determine the level of saturation of land and whether or not particular areas of a field have soil moisture levels that indicate drought regions. In an embodiment, soil moisture data may be obtained from NASA's Land Data Assimilation Systems (LDAS) servers. LDAS is a project designed to collect and construct land surface model datasets from precipitation data, to record the soil moisture across various areas. In an embodiment, soil moisture datasets may be obtained by digital query messages from an application computer to LDAS server computers in which the queries request soil moisture data for particular areas of interest. In another embodiment, soil moisture data may be used to predict future remotely sensed signals based upon soil moisture observations. For example, changes in soil moisture have a delayed effect on crop growth. This delayed effect may be used to predict future remotely sensed signals. Approaches for analyzing soil moisture data are discussed in detail in the SOIL SPECTRUM DATA section herein.

3.2 Aggregating Data Records

At step 510 agricultural data records are aggregated into one or more geo-specific time series that represent a specified time frame. For example, the data record aggregation instructions 171 provide instruction to the agricultural intelligence computer system 130 to aggregate the agricultural data records for specific geo-locations into multiple geo-specific time series. In an embodiment remotely sensed signal data received that cover a time period from January to August for several specific subfields within the target field are aggregated using the data record aggregation instructions 171 into a time series that includes data points from the several specific subfields covering time periods between January through August.

In an embodiment, the data record aggregation instructions 171 provide instructions to aggregate the remotely sensed signal data from several specific subfields covering time periods between January through August into multiple time series, where each time series includes remotely sensed signal data from one specific subfield. Thereby resulting in multiple time series where each time series represents a subfield and a time period from January through August. Other embodiments may include, but are not limited to, a combination remotely sensed data from multiple of subfields covering a specific time period.

In an embodiment, the data record aggregation instructions 171 may include instructions to first filter out agricultural data values that correspond to remotely sensed signals that are contaminated by cloud cover, snow, or other shadowing effects. In an embodiment, the data record aggregation instructions 171 may include instructions to preprocess the geo-specific time series to remove data points that may unnecessarily skew or otherwise bias the features of the geo-specific time series. Preprocessing and filtering are discussed in detail in the SIGNAL PREPROCESSING section herein.

At step 515 one or more representative features are selected from the one or more geo-specific time series and are inserted into a covariate matrix stored in computer memory. In an embodiment, the data record aggregation instructions 171 includes instructions to select one or more features that represent the relationship between yield and remotely sensed signal data. For example, the data record aggregation instructions 171 include selecting the mean EVI value from a subset of the geo-specific time series, such as the subset of EVI values that represent data points from day-of-year (DOY) 175 through DOY 250 for the specific field of interest. The purpose of selecting the mean value from a subset of data points is that specific subsets for specific types of remotely sensed signal data points work better for differentiating yield differences. Other embodiments may include smaller or larger subsets of DOY periods and different VI indices. In another embodiment, the data record aggregation instructions 171 include selecting the maximum value of the geo-specific time series as a representative feature to be included in the covariate matrix.

Figure 7:
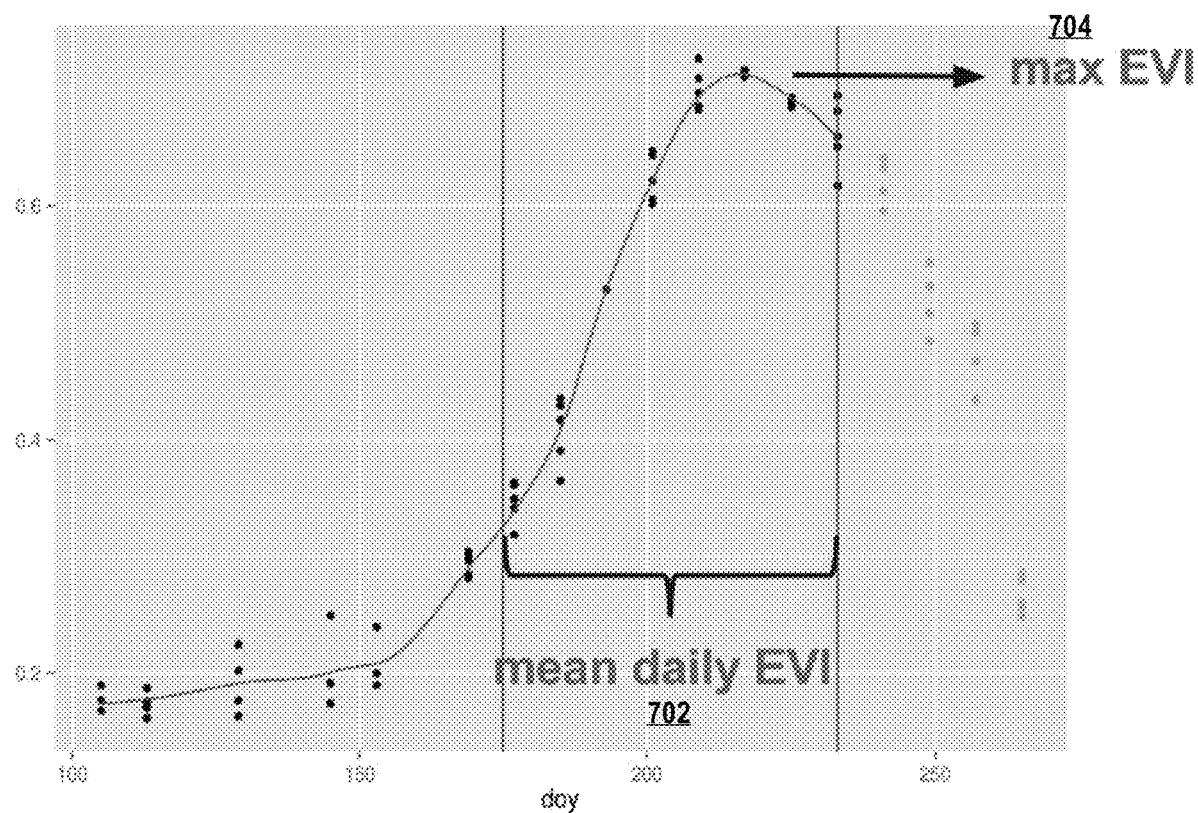
FIG. 7 illustrates a geo-specific time series of calculated enhanced vegetation index (EVI) values for a specific field.

FIG. 7 depicts a geo-specific time series of calculated EVI values for the specific field. Subset 702 represents a DOY period that is used for determining the mean EVI value for the geo-specific time series. For example, the mean EVI value is calculated from all EVI values within the geo-specific time series that fall within the range defined by subset 702. Max value 704 represents the maximum EVI value extracted and saved with the covariate matrix for the specific field of interest.

In an embodiment, when in-season EVI values are calculated from remote sensor data, the data may only be available up until a certain date d. The available remote sensor data may not cover the entire DOY period configured by the system 130. In this case the system 130 uses the available days up to date d, to calculate the mean. For example the system 130 calculates the mean EVI value for duration from DOY 175 to DOY d.

3.3 Determining Field Specific Crop Yield

In an embodiment crop yield is estimated for the target field using remotely sensed signal data for the target field up to a specified date. In an embodiment crop yield estimating instructions 175 include instructions to determine the estimated crop yield for the target field at a specified date using the covariate matrix for the target field and a linear regression model tailored to the specific field of interest. A linear regression model is a model that describes the relationship between a dependent variable and independent variables. In this context, the dependent variable is the crop yield for the target field, and the one or more independent variables are the covariate values in the covariate matrix. The linear relationship is modeled through an error term ε, which is an unobserved random variable and incorporated regression coefficients, β.

In an embodiment, linear regression instructions 172 include instructions to create a baseline linear regression model that is based upon a single set of regression coefficient and error term. Creation of the baseline linear regression model is discussed in detail in the BASELINE LINEAR REGRESSION section herein. In another embodiment, mixture linear regression instructions 173 include instructions to create a mixture linear regression model that is based upon multiple sets of regression coefficients and error terms. Creation of the mixture linear regression model is discussed in detail in the MIXTURE LINEAR REGRESSION section herein. 3.3.1 BASELINE LINEAR REGRESSION. In an embodiment, step 520(a) in FIG. 5(a) is implemented using linear regression instructions 172 to determine the regression parameters based upon a baseline linear regression model between field level yield and remote sensor data, such as EVI values. The baseline linear regression model may be implemented by computer computation of:

$$Y_{l,t} = (1 X_{l,t,d}^T) \beta_d + \varepsilon_{l,t,d}$$

where:

$Y_{l,t}$: equals the crop yield for a specific field l for a given year t.

$X_{l,t,d}^T$: equals the transpose of covariate matrix X for field l and year t, based upon EVI values up until prediction day d.

$\beta_d$: equals the regression coefficient based upon data points up until prediction day d.

$\varepsilon_{l,t,d}$: equals the error term for field l and year t, based upon EVI values up until prediction day d.

In order to determine the crop yield $Y_{l,t}$ on a specific prediction day d within year t, the linear regression instructions 172 set the β regression coefficient and ε error term based upon a distribution for each. The linear regression instructions 172 may request the β regression coefficient and ε error term from the distribution generation instructions 174, where the distribution generation instructions 174 utilize historical data up to the same prediction day d in each year to determine the β regression coefficient.

For example, the distribution generation instructions 174 include instructions to generate the β regression coefficient and ε error term by drawing independently and identically distributed samples from normal distributions as illustrated below.

$$\beta \sim^{iid} N(\beta_0, \Sigma_0)$$

$$\varepsilon_{l,t} \sim^{iid} N(0, \sigma^2)$$

A normal distribution is a function that represents the distribution of a random variable as a symmetrical bell-shaped graph. It is denoted by the function N(μ,σ), where μ represents the mean or expectation of the distribution and $\sigma^2$ represents the variance. In this case, the random samples are independently and identically distributed, so that each of them follow the same probability distribution as the others and all random samples are mutually independent from each other. The calculated β regression coefficient and ε error term are then used by the linear regression instructions 172 to generate the simple linear regression model.

At step 525(*a*) the crop yield using baseline linear regression model is determined. In an embodiment, the crop yield estimating instructions 175 include instruction to use the mean EVI feature from the target field covariate matrix to determine the target field crop yield at prediction day d based upon the simple linear regression model as described above. In other embodiments, the crop yield estimating instructions 175 include instruction to use the max EVI feature from the target field to determine the target field crop yield at prediction day d based upon the simple linear regression model. The crop yield estimating instructions 175 may be configured to use the max EVI feature over the mean EVI feature when the prediction day d is a date relatively early on in the crop season. Yet other embodiments may use different features from the target field covariate matrix when determining the estimated crop yield at prediction day d.

In an embodiment, the crop yield estimating instructions 175 provide instructions to determine the distribution of the estimated crop yield using a normal distribution function.

In an embodiment, a prediction interval is determined along with the distribution set. The prediction interval associated with the crop yield is a range calculated using the crop yield estimating instructions 175, which is expected to cover the true yield value with certain probability. When the probability of covering the true yield is fixed, narrower prediction intervals provide greater certainty for accurate yield prediction. For example the crop yield estimating instructions 175 provide instruction to calculate a prediction interval that is expected to cover the true crop yield 90% of the time. In this example, if the predicted crop yield is 165 bushels per acre and the prediction interval range is a very small range, such as 155-170 bushels per acre, then the certainty associated with the predicted crop yield is high because over 90% of the predictions resulted in a very narrow range of values. However, if in the previous example the prediction interval is 120-200 bushels per acre, then the certainty associated with the predicted crop yield is lower because to achieve the same probability of covering the true yield a range of 80 bushels per acre is needed instead of 15 bushels per acre. The benefit of receiving an associated prediction interval is that it allows for better understanding the certainty behind the predicted crop yield value.

In an embodiment, a distribution set associated with the predicted crop yield value may be calculated to provide further information of the predicted crop yield. For instance, by providing the entire distribution set, a user 102 may further calculate risk, revenue, or other predictions based upon the distribution set of yield values.

3.3.2 Mixture Regression Logic

An alternative embodiment to using the baseline linear regression model for crop yield estimation is a mixture linear regression model. Step 520(*b*) in FIG. 5(*b*) depicts the process of creating a mixture linear regression model. A mixture linear regression model is a probabilistic mixture of multiple linear regression models where a linear dependence between responses and covariates exists but coefficients and variations used to describe the linear dependence may vary among a set of values each with probabilities assigned to them.

For example, if n observations of responses and their corresponding covariates are denoted as $(Y_1, X_1)$, $(Y_2, X_2)$, ..., $(Y_n, X_n)$, then a mixture linear regression model with k parameter components assumes that:

$$Y_i \mid X_i = \begin{cases} X_i\beta_1 + \varepsilon_{i,1}, & \text{with probability } \lambda_1 \\ X_i\beta_2 + \varepsilon_{i,2}, & \text{with probability } \lambda_2 \\ \quad \vdots \\ X_i\beta_k + \varepsilon_{i,k}, & \text{with probability } \lambda_k \end{cases}$$

The k parameter components each represent a parameter component group that includes a β regression coefficient, a σ standard deviation, and ε error term as defined by the baseline linear regression model, based upon an historical geo-specific time series specific to a particular field. Therefore each pair of $(Y_i, X_i)$ from the n pairs has particular probabilities for each of the k parameter components groups. Each probability, λ, is the probability that the parameter component group fits covariate $X_i$. The sum of each probability, λ for each parameter component group, for $(Y_i, X_i)$ equals 1. The error terms described $\varepsilon_{i,1}, \ldots, \varepsilon_{i,k}$ are independent errors. In an embodiment, distributions for parameter component values including β regression coefficient, a standard deviation, and ε error term are determined based upon distribution generation instructions 174 as described in the section titled BASELINE LINEAR REGRESSION.

A membership variable $T_l$ may be designated for each field l in the linear regression model. The membership variable $T_l$ defines which component group the field l belongs to in the mixture linear regression model and controls the probability distribution of its yield responses. Having the same $T_l$ for the same field l means observations of responses on the same field l are constrained to share the same probabilities for the k parameter components groups. The purpose of providing this constraint is that the mixture linear regression model may provide insights on those sub-populations and indicate similar latent variables related to field characteristics. For example, these latent variables may describe various properties such as soil texture, color, and other micro-environment factors specific to that particular field.

Given the membership variable $T_l$ for field l, the distribution of the crop yield at field l in any season t may be described as:

$$Y_{l,t} \mid T_l = j \sim^{ind} N\left(\begin{pmatrix} 1 \\ X_{l,t} \end{pmatrix} \beta_{(j)}, \sigma_{(j)}^2\right)$$

where the probability of $T_l = j$ is described as $\lambda_j$ for components $\beta_{(j)}, \sigma_{(j)}^2$.

In an embodiment, when estimating a potential crop yield for a target field l, the mixture linear regression model is checked to see if historical data related to the target field exists. If historical data related to the target field exists, then the mixture linear regression model is configured to predict the crop yield based on the group membership variable $T_l$ and the probabilities and parameter values associated with that membership variable. If however, the mixture linear regression model does not contain historical data related to the target field, then the mixture linear regression model may be configured to use the average probabilities and parameter values across all existing membership variables in the mixture linear regression model and make predictions accordingly.

Additionally, when estimating potential crop yield for a target field, if additional historical data for the target field, which was not previously part of the mixture linear regression model, is provided then the mixture linear regression model may incorporate the additional historical data for the target field and recalculate parameter values and probabilities for parameter groups for the target field $T_{n+1}$. If the target field $l_{n+1}$ is a new field not previously part of the set of fields $\{1, 2, \ldots, G\}$ then new target field $l_{n+1}$ is added to the set of fields $\{1, 2, \ldots, G\}$ and probabilities for the set of membership variables $T_n$ are recalculated.

Figure 8:
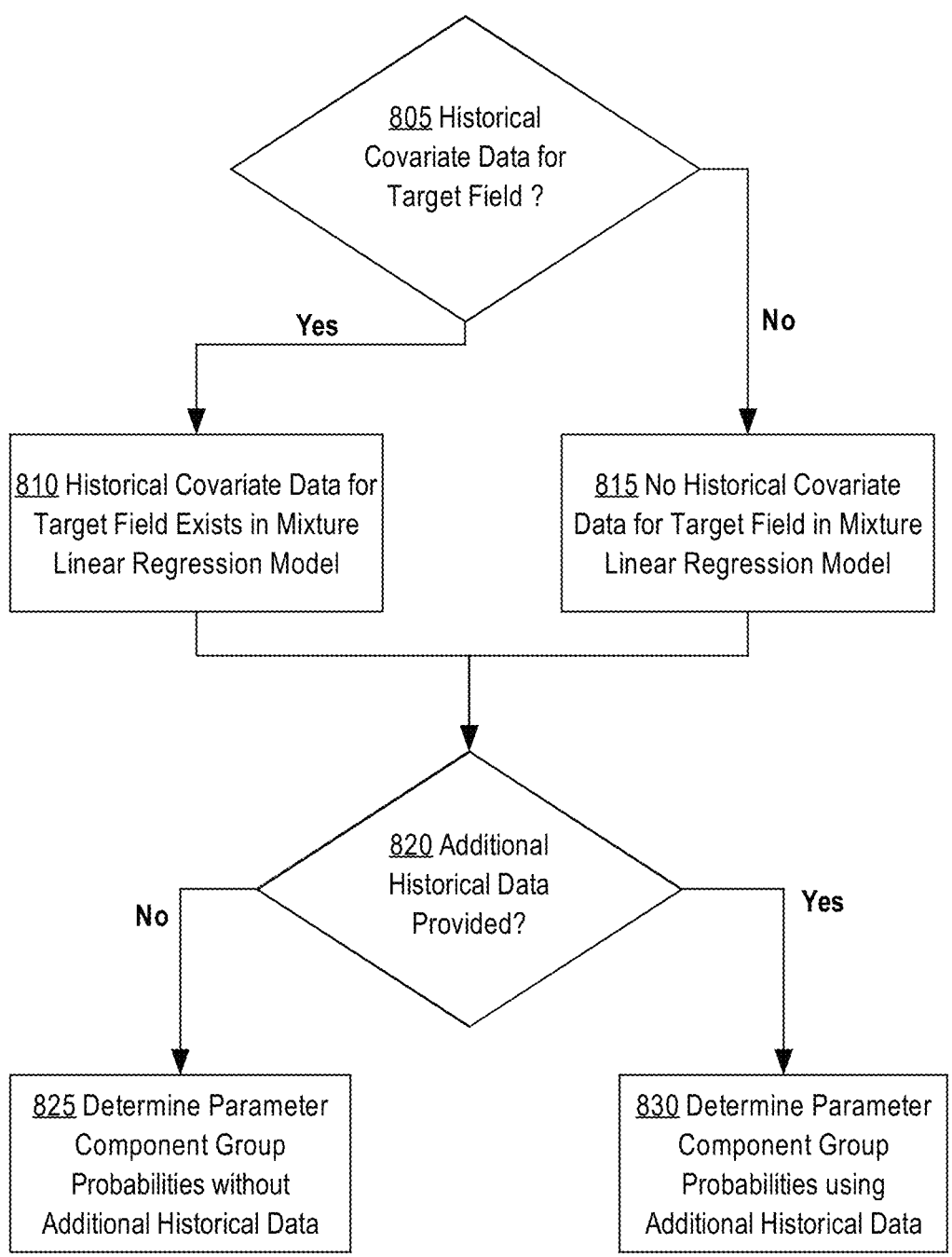
FIG. 8 depicts an example process of assigning probability values to multiple parameter component groups in the mixture linear regression model.

FIG. 8 provides an example of the process of assigning probability values to the set of parameter component groups for any target field where the crop yield is predicted using the mixture linear regression model.

At step 805, the mixture linear regression instructions 173 provide instructions to determine whether sufficient historical data related to the target field exists in the current mixture linear regression model. The purpose of determining if historical data exists is to determine whether the target covariate data can be associated with an already established membership variable. If historical data for the target field exists then the mixture linear regression model can be configured to apply the probabilities associated with that membership variable to the target covariate data. For example, if target field $l_{n+1}$ represents the target field then the mixture linear regression instructions 173 determine whether the $l_{n+1}$ belongs to the set of fields, such that $l_{n+1} \in \{1, 2, \ldots, G\}$. If $l_{n+1}$ belongs to the set of fields then membership variable $T_{n+1}$ for that particular field is used.

Step 810 represents a scenario where $l_{n+1}$ belongs to the set of fields $\{1, 2, \ldots, G\}$ and the particular membership variable $T_{n+1}$ is used for the target field. In an embodiment, the mixture linear regression instructions 173 compile a set of customized historical data related to the target field $l_{n+1}$ to be used to determine parameter component group probabilities associated with the particular membership variable $T_{n+1}$.

Step 815 represents a scenario where $l_{n+1}$ does not belong to the set of fields $\{1, 2, \ldots, G\}$, such that $l_{n+1} \notin \{1, 2, \ldots, G\}$. In an embodiment, the mixture linear regression instructions 173 compile a full set of historical data, which includes all fields measured to determine parameter component group probabilities associated with the membership variable $T_{n+i}$, where $T_{n+1}$ represents a new membership variable for the new field.

At step 820, the mixture linear regression instructions 173 determine if additional historical data related to target field $l_{n+1}$, not previously part of the mixture linear regression model, is received. If additional historical data is provided then at step 830 the mixture linear regression instructions 173 may provide instruction to incorporate the field specific historical data into the historical data already part of the mixture linear regression model. Otherwise at step 825, the mixture linear regression instructions 173 determine parameter component group probabilities without additional historical data.

In an embodiment, probabilities for parameter component groups within the mixture linear regression model are determined using an Expectation-Maximization (EM) algorithm. EM algorithm is a method for finding the maximum likelihood with incomplete data by iteratively maximizing the conditional log-likelihood of "complete" data given "incomplete" data and the current fit model parameters. In other embodiments membership probabilities may be determined using other algorithms such as Gibbs sampling.

At step 830 the mixture linear regression instructions 173 determine parameter component group probabilities using additional target field specific historical data that is not currently part of the mixture linear regression model data. In an embodiment, received external data 110 may include additional target field specific historical data that was not previously incorporated into the mixture linear regression model. The probabilities for parameter component groups associated with linear regression models within the mixture linear regression model are calculated accounting for the additional target field specific data.

At step 525(b) of FIG. 5(b) the crop yield estimating instructions 175 provide instruction to determine the crop yield using the mixture linear regression model. In an embodiment, the crop yield estimating instructions 175 include instruction to determine the crop yield for the target field as a summation of estimated crop yields based upon the probabilities of the parameter component groups.

In an embodiment, the crop yield estimating instructions 175 provide instruction to determine the distribution of the estimated crop yield using a normal distribution function when the membership variable is given:

$$Y_{l,t} \mid T_l = j \sim^{ind} N\left(\begin{pmatrix} 1 \\ X_{l,t} \end{pmatrix} \beta_{(j)}, \sigma^2_{(j)}\right)$$

where $Y_{l,t}$ includes a normal distribution set for the predicted crop yield. In an embodiment, a prediction interval is determined along with the distribution set. The prediction interval associated with the crop yield is a range calculated using the crop estimating instructions 175, which is expected to cover the true yield value with certain probability.

4. External Data 4.1 Remote Sensing Data

Remote sensors measure spectral bands related to visible and near-infrared light reflected by the land surface. Detecting the level of vegetation in a particular geographic region may be performed using computing elements programmed to execute a mathematical combination and/or transformation between different remotely sensed spectral ranges that accentuate the spectral properties in plants. These combinations are referred to as Vegetation Indices.

In an embodiment, the data record aggregation instructions 171 may provide instruction to the agricultural intelligence computer system 130 to select different Vegetation Indices in order to evaluate different spectral properties. Different Vegetation Indices may be used to analyze remotely sensed signals and determine whether a particular area contains live green vegetation. Live green plants absorb solar radiation within the range of 400-700 nanometers (nm), such as visible red (620-670 nm), and scatter solar radiation from the near-infrared (NIR) spectral region (841-876 nm). Meaning that mature green plants with many leaves would absorb visible red for photosynthesis purposes and simultaneously reflect back NIR radiation. One such Vegetation Index available is the enhanced vegetation index (EVI). The EVI is optimized to enhance the vegetation signal with improved sensitivity in high biomass regions by decoupling a canopy background signal and reducing atmospheric influences. The EVI is calculated as follows:

$$EVI = G \times \frac{(NIR - \text{red})}{(NIR + C_1 \times \text{red} - C_2 \times \text{blue} + L)}$$

Where:

G is a specific gain factor, coefficients $C_1$ and $C_2$ are related to the aerosol resistance term, L is a canopy background adjustment factor, and blue refers to the visible blue wavelength (459-479 nm).

In an embodiment, the data record aggregation instructions 171 may provide instruction to the agricultural intelligence computer system 130 to select the normalized difference vegetation index (NDVI). NDVI may be used to analyze remotely sensed signals and determine whether a particular area contains live green vegetation. The NDVI is calculated as a near-infrared/red ratio between the NIR and the visible red region.

$$NDVI=(NIR-red)/(NIR+red)$$

A high NDVI value means that the land region sensed contain a high density of green vegetation.

In an embodiment, the data record aggregation instructions 171 may provide instruction to the agricultural intelligence computer system 130 to select the green normalized difference vegetation index (GNDVI). The GNDVI, like NDVI measures the amount of green vegetation over a particular area. GNDVI measures solar radiation over a visible green wavelength range (545-565 nm). The GNDVI is calculated as a near-infrared/green ratio between the NIR and the visible green region.

$$GNDVI=(NIR-green)/(NIR+green)$$

In an embodiment, the data record aggregation instructions 171 may provide instruction to the agricultural intelligence computer system 130 to select the normalized difference water index (NDWI). The NDWI may also be used to analyze remotely sensed signals and determine the amount of water within vegetation. The benefit to selecting NDWI data is that it is less sensitive to atmospheric effects than NDVI. Atmospheric effects due to atmospheric gases and aerosol particles may distort remotely sensed data by scattering or absorbing direct or reflected sunlight. The NDWI is calculated as a ratio between different near-infrared spectral regions:

$$NDWI=(NIR-NIR2)/(NIR+NIR2)$$

where NIR2 covers wavelengths between 1230-1250 nm.

In an embodiment, the data record aggregation instructions 171 may provide instruction to the agricultural intelligence computer system 130 to select variant of the NDWI index called fNDWI. Like the NDWI, the fNDWI may be used to analyze remotely sensed signals and determine the amount of water within vegetation. The fNDWI is calculated as a ratio between the near-infrared spectral region (NIR) and an infrared region covering wavelengths between 1628-1652 nm (shortIR):

$$fNDWI=(NIR-shortIR)/(NIR+shortIR)$$

The benefit of using fNDWI over NDWI is that NIR2 values may be noisy or suffer from saturation. By using shortIR the saturation can be mitigated.

Using multiple vegetation indexes the agricultural intelligence computer system 130 is able to quantify the level of live crops, such as corn, planted in particular areas.

4.2 Soil Spectrum Data

The North America LDAS provide soil moisture data sets for several land surface data models. The land surface models provide a $\frac{1}{8}^{th}$ degree topographical grid resolution of regions of North America. Soil moisture data sets are representative of weather conditions for a specific area because it reflects the combination of effects from precipitation, temperature, and other soil properties.

Measured soil moisture values at a specific time may have an effect on crop growth which is not immediately observable. For example, soil moisture effects on crop growth may be visible in remotely sensed data several days after receiving the measure soil moisture values. In an embodiment, a relationship between soil moisture values and delayed remotely sensed EVI signals may exist, where the delay is fixed at 20 days. A linear relationship may then be created using EVI signals and soil moisture sets, where soil moisture values are used to predict future EVI signals based upon the correlated linear relationship between measured EVI signals and measured soil moisture data sets.

In an embodiment, soil moisture data sets for specific geo-locations at specific times may be aggregated into independent geo-specific time series for a geographic area. In an embodiment, feature selection may be determined by computing average soil moisture over a particular range. For example, the average soil moisture may be calculated for every 5-day window over the entire season. Then the average soil moistures may be compared to an historical climatology average in order to discover soil moisture anomalies. For example, a historical climatology average for a specific region may be calculated over a 30 year period. Then soil moisture anomalies may be determined by comparing the calculated 5-day average soil moisture for a given region to the historical climatology average for that specific region. The soil moisture anomalies may then be extracted as selected features, such as relative wetness or relative dryness, for a covariate matrix.

5. Geo-Specific Time Series 5.1 Signal Preprocessing

The data record aggregation instructions 171 may provide instruction to preprocess the geo-specific time series to remove data points that may unnecessarily skew or otherwise bias the features of the geo-specific time series. In an embodiment, the geo-specific time series may be smoothed by implementing a locally weighted scatterplot smoothing technique. Locally weighted scatterplot smoothing is a method of using locally weighted linear regression to smooth data. The process is local because each smoothed value is determined by neighboring data points defined within the span. The process is weighted because a regression weight function is defined for the data points within the span.

Figure 6:
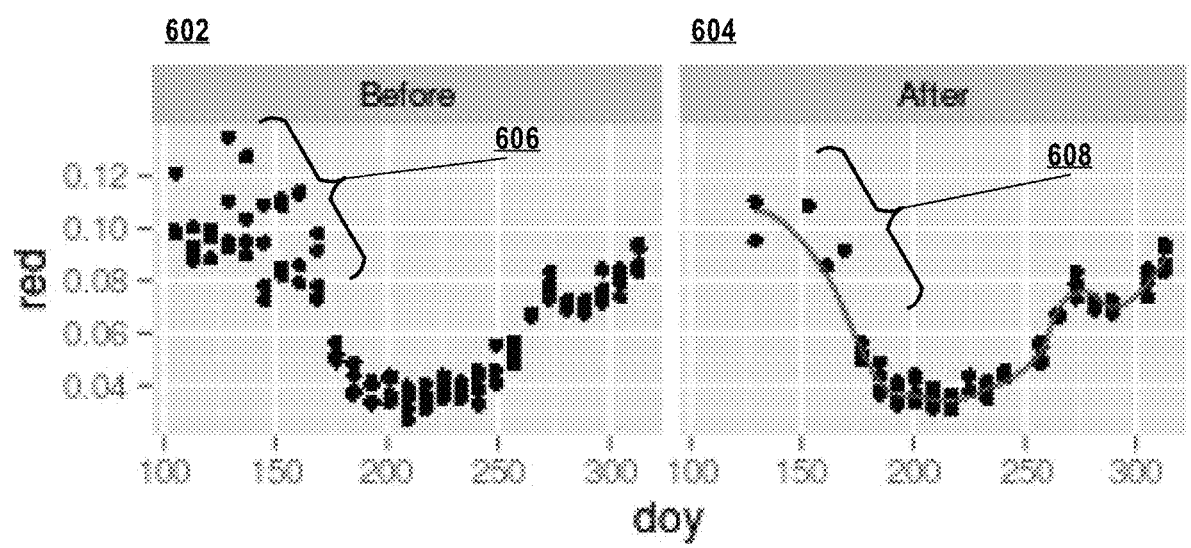
FIG. 6 illustrates preprocessing of remotely sensed signals and the application of locally weighted scatterplot smoothing to remotely sensed signals.

FIG. 6 illustrates signal preprocessing and applying the locally weighted scatterplot smoothing to visible red remotely sensed signals in a set of geo-specific time series representing a specific field in Iowa. Graph 602 depicts the geo-specific time series before signal preprocessing and applying locally weighted scatterplot smoothing. As shown by region 606, there are many erratic outliers that are spread from about day-of-year (doy) 125 to doy 170. These outliers may be a product of contaminated remotely sensed signals prior to signal preprocessing and filtering.

Graph 604 depicts the geo-specific time series after signal preprocessing and applying locally weighted scatterplot smoothing. As shown by region 608 the same erratic outliers have been filtered out of the dataset. Then weighted scatterplot smoothing is applied to the cleansed data create a generalized trend. By applying signal preprocessing and locally weighted scatterplot smoothing to the geo-specific time series a more accurate trend line is used to depict the overall crop conditions for that specific field.

In another embodiment, the geo-specific time series may be smoothed by implementing a scaled Gaussian density.

Scaled Gaussian density is defined using a density function $\phi(x,\mu,\sigma)$, where $\mu$ is the mean and $\sigma$ is the standard deviation of a normal distribution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    using data record aggregation instructions in a server computer system, receiving one or more agricultural data records that represent a type of covariate data value for plants at a specific geo-location at a specific time, wherein the type of covariate data value includes at least one of a remotely sensed spectral property of plant records using a particular spectral bandwidth range, and a soil moisture record;
    using the data record aggregation instructions, aggregating the one or more agricultural data records to create and store, in computer memory, one or more geo-specific time series over a specified time;
    using the data record aggregation instructions, selecting one or more representative features from the one or more geo-specific time series and creating, for each specific field, a covariate matrix in computer memory comprising the representative features selected from the one or more geo-specific time series; and
    using crop yield estimating instructions in the server computer system, determining a field specific crop yield for a specific date by using a mixture linear regression model to calculate the field specific crop yield from the covariate matrix that represents the specific field, the mixture linear regression model having one or more linear regression models for each of the respective one or more representative features used to create the covariate matrix, each of the one or more linear regression models having;
    an associated regression coefficient for a particular feature of the one or more representative features calculated from a probability distribution generated by distribution generation instructions, and
    an error term for the particular feature calculated from a probability distribution generated by distribution generation instructions;
    using the crop yield estimating instructions in the server computer system, assigning a probability value to each of the one or more linear regression models of the mixture linear regression model, corresponding to a probability that the particular feature associated with a particular linear regression model fits the covariate matrix that represents the specific field;
    based upon the field specific crop yield, modifying an operating parameter defined in one or more scripts used to program agricultural equipment used for treatment of the specific field.

2. The method of claim 1, further comprising aggregating the one or more agricultural data records to create one or more geo-specific time series by selecting data values from the one or more agricultural data records based upon a vegetation index, wherein a vegetation index is a combination of one or more wavelength ranges of the remotely sensed spectral property of plant records.

3. The method of claim 1, further comprising creating one or more geo-specific time series by applying locally weighted scatterplot smoothing to a subset of the one or more geo-specific time series.

4. The method of claim 1, further comprising selecting one or more representative features from one or more geo-specific time series by selecting a maximum value of the geo-specific time series and a mean value of a selected portion of the geo-specific time series.

5. The method of claim 1, further comprising determining a field specific crop yield for a specific date further by determining a prediction interval associated with the field specific crop yield, wherein the prediction interval is range of values that measures a level of certainty associated with the field specific crop yield.

6. A method comprising:
    using data record aggregation instructions in a server computer system, receiving one or more agricultural data records that represent a type of covariate data value for plants at a specific geo-location at a specific time, wherein the type of covariate data value includes at least one of a remotely sensed spectral property of plant records using a particular spectral bandwidth range, and a soil moisture record;
    using the data record aggregation instructions, aggregating the one or more agricultural data records to create and store, in computer memory, one or more geo-specific time series over a specified time;
    using the data record aggregation instructions, selecting one or more representative features from the one or more geo-specific time series and creating for each specific field a covariate matrix in computer memory comprising the representative features selected from the one or more geo-specific time series;
    using mixture linear regression instructions in the server computer system, assigning a probability value to a parameter component group in a set of parameter component groups, wherein each component group within the set of parameter component groups comprises:
        one or more regression coefficients calculated from a probability distribution generated using distribution generation instructions in the server computer system;
        an error term calculated from a probability distribution generated by distribution generation instructions;
    using crop yield estimating instructions in the server computer system, determining a field specific crop yield for a specific date by using a mixture linear regression model to calculate the field specific crop yield based upon the covariate matrix and the probability values assigned to each parameter component group in the set of parameter component groups; and
    based upon the field specific crop yield, modifying an operating parameter defined in one or more scripts used to program agricultural equipment used for treatment of the specific field.

7. The method of claim 6, further comprising assigning probability values to a parameter component groups in a set of parameter component groups based upon historical data values related to a specific geo-location of interest.

8. The method of claim 6, further comprising assigning probability values to a parameter component groups in a set of parameter component groups based upon historical data values related to multiple measured crop fields.

9. The method of claim 6, further comprising aggregating the one or more agricultural data records to create one or more geo-specific time series by selecting data values from the one or more agricultural data records based upon a vegetation index, wherein a vegetation index is a combination of one or more wavelength ranges of the remotely sensed spectral property of plant records.

10. The method of claim 6, further comprising creating one or more geo-specific time series by applying locally weighted scatterplot smoothing to a subset of the one or more geo-specific time series and selecting median values from for each time interval to create the one or more geo-specific time series.

11. The method of claim 6, further comprising selecting one or more representative features from the one or more geo-specific time series by selecting a maximum value of the geo-specific time series and a mean value of a selected portion of geo-specific time series.

12. The method of claim 6, further comprising determining a field specific crop yield for a specific date further by determining a prediction interval associated with the field specific crop yield, wherein the prediction interval is range of values that measures a level of certainty associated with the field specific crop yield.

13. A data processing system comprising:
a memory;
one or more processors coupled to the memory and configured to perform a method, the method comprising;
receiving one or more agricultural data records that represent a type of covariate data value for plants at a specific geo-location at a specific time, wherein the type of covariate data value includes at least one of a remotely sensed spectral property of plant records using a particular spectral bandwidth range, and a soil moisture record;
aggregating the one or more agricultural data records to create and store, in computer memory, one or more geo-specific time series over a specified time;
selecting one or more representative features from the one or more geo-specific time series and creating, for each specific field, a covariate matrix in computer memory comprising the representative features selected from the one or more geo-specific time series;
determining a field specific crop yield for a specific date by using a linear regression model to calculate the field specific crop yield from the covariate matrix that represents the specific field, one or more regression coefficients calculated from a probability distribution generated by distribution generation instructions, and an error term;
modifying an operating parameter defined in one or more scripts used to program agricultural equipment used for treatment of the specific field based upon the field specific crop yield.

14. The data processing systems of claim 13, the method further comprising aggregating the one or more agricultural data records to create one or more geo-specific time series by selecting data values from the one or more agricultural data records based upon a vegetation index, wherein a vegetation index is a combination of one or more wavelength ranges of the remotely sensed spectral property of plant records.

15. The data processing system of claim 13, the method further comprising creating one or more geo-specific time series by applying locally weighted scatterplot smoothing to a subset of the one or more geo-specific time series.

16. The data processing system of claim 13, the method further comprising selecting one or more representative features from one or more geo-specific time series by selecting a maximum value of the geo-specific time series and a mean value of a selected portion of the geo-specific time series.

17. The data processing system of claim 13, the method further comprising determining a field specific crop yield for a specific date further by determining a prediction interval associated with the field specific crop yield, wherein the prediction interval is range of values that measures a level of certainty associated with the field specific crop yield.

18. A data processing system comprising:
a memory;
one or more processors coupled to the memory;
data record aggregation instructions stored in the memory, executed by the one or more processors, and configured to cause the one or more processors to receive one or more agricultural data records that represent a type of covariate data value for plants at a specific geo-location at a specific time, wherein the type of covariate data value includes at least one of a remotely sensed spectral property of plant records using a particular spectral bandwidth range, and a soil moisture record;
the data record aggregation instructions stored in the memory, executed by the one or more processors, and configured to cause the one or more processors to aggregate the one or more agricultural data records to create and store, in the memory, one or more geo-specific time series over a specified time;
the data record aggregation instructions stored in the memory, executed by the one or more processors, and configured to cause the one or more processors to select one or more representative features from the one or more geo-specific time series and creating for each specific field a covariate matrix in the memory comprising the representative features selected from the one or more geo-specific time series;
mixture linear regression instructions stored in the memory, executed by the one or more processors, and configured to cause the one or more processors to assign a probability value to a parameter component group in a set of parameter component groups, wherein each component group within the set of parameter component groups comprises:
one or more regression coefficients calculated from a probability distribution generated using distribution generation instructions stored in memory, executed by the one or more processors;
an error term calculated from a probability distribution generated by distribution generation instructions stored in the memory, executed by the one or more processors;
crop yield estimating instructions stored in memory, executed by the one or more processors, and configured to cause the one or more processors to determine a field specific crop yield for a specific date by using a mixture linear regression model to calculate the field specific crop yield based upon the covariate matrix and the probability values assigned to each parameter component group in the set of parameter component groups.

19. The data processing system of claim 18, further comprising instructions stored in memory, executed by the one or more processors, and configured to cause assignment of probability values to a parameter component group in a set of parameter component groups based upon historical data values related to a specific geo-location of interest.

20. The data processing system of claim 18, further comprising instructions stored in memory, executed by the one or more processors, and configured to cause assignment of probability values to a parameter component group in a set of parameter component groups based upon historical data values related to multiple measured crop fields.

21. The data processing system of claim 18, further comprising instructions stored in memory, executed by the one or more processors, and configured to cause aggregation of the one or more agricultural data records to create one or more geo-specific time series by selecting data values from the one or more agricultural data records based upon a vegetation index, wherein a vegetation index is a combination of one or more wavelength ranges of the remotely sensed spectral property of plant records.

22. The data processing system of claim 18, further comprising instructions stored in memory, executed by the one or more processors, and configured to cause creation of one or more geo-specific time series by applying locally weighted scatterplot smoothing to a subset of the one or more geo-specific time series and selecting median values from for each time interval to create the one or more geo-specific time series.

23. The data processing system of claim 18, further comprising instructions stored in memory, executed by the one or more processors, and configured to cause selection of one or more representative features from the one or more geo-specific time series by selecting a maximum value of the geo-specific time series and a mean value of a selected portion of geo-specific time series.

24. The data processing system of claim 18, further comprising instructions stored in memory, executed by the one or more processors, and configured to cause determination of a field specific crop yield for a specific date further by determining a prediction interval associated with the field specific crop yield, wherein the prediction interval is range of values that measures a level of certainty associated with the field specific crop yield.

* * * * *